US012687366B1

(12) United States Patent
Walters

(10) Patent No.: US 12,687,366 B1
(45) Date of Patent: Jul. 21, 2026

(54) CLEANING APPARATUS FOR SEALED FIREARM SUPPRESSOR

(71) Applicant: Michael Walters, Conroe, TX (US)

(72) Inventor: Michael Walters, Conroe, TX (US)

( * ) Notice: Subject to any disclaimer, the term of this patent is extended or adjusted under 35 U.S.C. 154(b) by 0 days.

(21) Appl. No.: 19/263,500

(22) Filed: Jul. 9, 2025

Related U.S. Application Data

(60) Provisional application No. 63/788,563, filed on Apr. 14, 2025.

(51) Int. Cl.
*F41A 29/00* (2006.01)
*B08B 3/02* (2006.01)

(52) U.S. Cl.
CPC ................ *F41A 29/00* (2013.01); *B08B 3/02* (2013.01)

(58) Field of Classification Search
CPC .......... F41A 29/00; F41A 29/02; F41A 29/04; B08B 3/02; B08B 9/00
See application file for complete search history.

(56) References Cited

U.S. PATENT DOCUMENTS

| | | | | | |
|---|---|---|---|---|---|
| 1,222,028 | A * | 4/1917 | Proctor | F41A 29/02 | 42/95 |
| 1,308,469 | A * | 7/1919 | Amet | F41A 29/02 | 134/167 C |
| 2,430,164 | A * | 11/1947 | Dew, Jr. | F41A 29/02 | 15/104.165 |
| 5,202,523 | A * | 4/1993 | Grossman | F41A 29/00 | 134/1 |

(Continued)

FOREIGN PATENT DOCUMENTS

| | | | |
|---|---|---|---|
| CN | 216175106 U | 4/2022 | |
| RU | 2530206 C1 | 10/2014 | |

(Continued)

OTHER PUBLICATIONS

C-RICH. Automatic Gun Barrel Cleaner. C-RICH, Seongnam-si, Gyeonggi-do, Korea. http://okcrich.com/contents.php?contents=m_auto.

(Continued)

*Primary Examiner* — Joshua E Freeman
(74) *Attorney, Agent, or Firm* — Nolan Heimann LLP; Adam Diament

(57) ABSTRACT

A cleaning apparatus for internally cleaning firearm suppressors is disclosed. The cleaning apparatus includes a reservoir configured to contain a cleaning fluid, a pump in fluid communication with the reservoir, and a spray tube coupled to the pump and dimensioned to be insertable within a firearm suppressor. The spray tube includes a sealed distal end and a plurality of apertures arranged to discharge pressurized fluid radially outward, with alternating patterns along opposing sides. A fluid return system collects the discharged fluid and recirculates it to the reservoir via a fluid return connector positioned above the reservoir floor to minimize particulate intake. The apparatus may include a cylindrical reservoir supported by a base housing, compression fittings, a removable lid, electrical controls, and an accessible drain assembly. A support structure holds the suppressor in a vertical orientation with drainage clearance. The system enables efficient, contained, and repeatable internal cleaning of firearm suppressors.

19 Claims, 9 Drawing Sheets

(56) References Cited

U.S. PATENT DOCUMENTS

| | | | |
|---|---|---|---|
| 5,743,040 A | 4/1998 | Kennedy | |
| 6,023,873 A | 2/2000 | Baird | |
| 7,676,878 B2 * | 3/2010 | Parker-Smith | A46B 13/02 42/95 |
| 11,391,535 B2 * | 7/2022 | Begins | B08B 9/0326 |
| 11,781,828 B1 | 10/2023 | Terrell | |
| 11,890,653 B2 * | 2/2024 | Ellis, III | B08B 9/0326 |
| 2015/0176939 A1 * | 6/2015 | Thalmann | F41A 29/04 42/95 |
| 2019/0249942 A1 | 8/2019 | Dunham | |
| 2021/0031247 A1 * | 2/2021 | Ellis, III | B08B 3/12 |
| 2021/0063109 A1 * | 3/2021 | Begins | F41A 29/00 |
| 2021/0309944 A1 * | 10/2021 | Brooker | B08B 3/02 |
| 2023/0358497 A1 | 11/2023 | Mahajan et al. | |

FOREIGN PATENT DOCUMENTS

| | | |
|---|---|---|
| WO | 2009150674 A1 | 12/2009 |
| WO | 2009151428 A2 | 12/2009 |

OTHER PUBLICATIONS

Beechwood Equipment, 'Otis Suppressor Cleaner & Reclaimer (OSCR)', Beechwood Equipment product description, Guildford, Surrey, UK.

* cited by examiner

CLEANING APPARATUS FOR SEALED FIREARM SUPPRESSOR

CROSS-REFERENCE TO RELATED APPLICATIONS

This application claims benefit of and priority to U.S. Provisional Patent Application 63/788,563, titled, "Internal Spray Cleaning Device for Sealed Firearm Suppressor," filed on Apr. 14, 2025, which is hereby incorporated by reference in its entirety.

FIELD OF THE DISCLOSURE

The present invention relates to firearm maintenance systems, and in particular, relates to a cleaning device for sealed firearm suppressors, used for removing internal fouling and residue buildup in suppressors that are not designed to be disassembled, with application in civilian, law enforcement, and military firearm maintenance routines.

BACKGROUND OF THE INVENTION

Suppressors are widely used across various firearm platforms to reduce noise, muzzle flash, and recoil. These devices, especially sealed suppressors that lack disassembly features, are subject to extensive internal carbon fouling, unburnt powder accumulation, and metal particulate buildup from repeated firing. Conventional cleaning methods include solvent soaking and ultrasonic cleaning, each with their own limitations. Solvent soaking typically requires prolonged immersion and manual agitation, often exceeding 12-24 hours, to yield partial results. Ultrasonic cleaning systems, while more effective, require high-powered specialized equipment that is costly and typically restricted to industrial or professional armory environments.

Several prior art references disclose firearm cleaning systems with specific functionalities. One such example is U.S. Pat. No. 11,781,828 B1, entitled "Firearm Maintenance System" ("the '828 Patent"). The '828 Patent describes a comprehensive firearm care system configured to clean and lubricate firearm parts through a closed-loop recirculation mechanism. While this system is designed for general firearm maintenance, it is primarily directed at cleaning barrel interiors, external components, and other accessible firearm parts, rather than addressing the internal geometry of suppressors.

Another example is U.S. Patent Application No. 2021/0063109 A1, entitled "Firearm Barrel Cleaning System" ("the '109 Application"). The '109 Application discloses a barrel-cleaning system that circulates cleaning fluid through a firearm barrel using a pump and receiver assembly, and induces cavitation through an ultrasonic transducer. Although this system introduces automation and improves cleaning efficacy, it is intended primarily for cleaning barrels and requires direct access to both ends of the firearm bore, making it unsuitable for cleaning sealed suppressors.

Yet another example is U.S. Patent Application No. 2019/0249942 A1, entitled "Self-Cleaning Firearms Suppressor" ("the '942 Application"). The '942 Application discloses a suppressor with internal design features, such as blast chambers and diffusers, that direct particulate matter away from the projectile path and into accumulation zones within the suppressor body. While this configuration delays the need for cleaning and facilitates disassembly-based maintenance, it does not provide an external cleaning apparatus and remains limited to specific suppressor constructions.

Although the above-discussed disclosures are beneficial, they have certain limitations. Existing systems are often tailored to general firearm components or rely on integrated design features. They may not adequately serve the need for external cleaning of sealed suppressors, which lack user-accessible internal chambers and require effective yet accessible maintenance solutions. Therefore, there is a need in the art for a suppressor cleaning system that enables thorough internal maintenance of sealed suppressors without requiring disassembly or industrial-grade equipment.

BRIEF SUMMARY OF THE PRESENT INVENTION

It is an object of the present invention to provide a cleaning apparatus for internally cleaning firearm suppressors, using a system that enables thorough maintenance without requiring disassembly of the suppressor.

It is another object of the present invention to provide a cleaning apparatus capable of recirculating cleaning fluid through firearm suppressors using a pressurized spray mechanism and a closed-loop fluid path.

In order to achieve one or more objects, the present subject matter provides a cleaning apparatus for internally cleaning firearm suppressors. The apparatus includes a reservoir configured to contain cleaning fluid. A pump is in fluid communication with the reservoir and is configured to pressurize cleaning fluid. A spray tube having a proximal end and a distal end is coupled at the proximal end to the pump. The spray tube includes a plurality of apertures distributed along its length and is configured to discharge pressurized cleaning fluid radially outward. The spray tube is dimensioned to be insertable within the bore of the firearm suppressor. The apparatus further includes a fluid return system configured to collect cleaning fluid discharged from the firearm suppressor and return the fluid to reservoir for recirculation through the pump.

In one aspect of the present subject matter, the spray tube has an outer diameter ranging from approximately 3 mm to 6 mm.

In another aspect of the present subject matter, the apertures on spray tube are arranged in an alternating pattern along opposing sides of the spray tube.

In yet another aspect, the distal end of the spray tube is sealed to direct the pressurized fluid through the apertures.

In another aspect, the fluid return system includes a suction strainer positioned in the reservoir.

In a related aspect, the suction strainer is configured to filter debris from the cleaning fluid returning to the pump.

In one embodiment, the apparatus further comprises a base housing that supports the reservoir and houses the pump.

In another embodiment, a drain assembly is connected to the reservoir and is accessible from the exterior of the base housing.

In yet another embodiment, the reservoir includes a removable lid configured to provide access to the interior of the reservoir.

In one aspect of the present subject matter, the reservoir has a bottom wall with at least two fluid connection ports, and the pump is positioned below the reservoir. The spray tube extends upward from the bottom wall and includes a sealed distal end and a plurality of apertures. A pressurized fluid supply line connects the pump to the spray tube through a first fluid connection port. A fluid return system connects the pump to a second fluid connection port and includes a suction strainer positioned in the reservoir. Electrical controls are operatively connected to the pump. The apparatus further includes a support structure configured to position the firearm suppressor over the spray tube in a vertical orientation with clearance from the bottom wall.

In one embodiment, the spray tube has an outer diameter of approximately 4 mm.

In another embodiment, the apertures are positioned along a middle portion of the spray tube's length, with the end portions remaining free of apertures.

In a related embodiment, the suction strainer is configured to prevent intake of settled particulates.

In one aspect, the apparatus includes the drain assembly with a third fluid connection port in the bottom wall and an externally accessible drain.

In another aspect, the reservoir is formed of a transparent material to allow visual monitoring of the cleaning operations.

In yet another aspect, the support structure includes spacer elements configured to elevate the suppressor above the bottom wall while allowing drainage from both ends of the suppressor.

In one embodiment, the reservoir has a cylindrical configuration and is supported on the base housing that contains the pump.

In another embodiment, the spray tube includes alternating apertures spaced along the central section and arranged such that adjacent apertures are positioned on opposite sides of the spray tube. The spray tube is secured to the base housing using compression fittings and is connected to the pump's discharge output.

In another embodiment, the fluid return system includes a suction strainer positioned in the reservoir and connected to an intake of the pump, wherein the suction strainer is configured to avoid intake of settled particulates.

In a related embodiment, the drain assembly includes a bottom drain port in fluid communication with the reservoir and an external quarter-turn valve.

In another aspect, the electrical controls are integrated into the base housing and are operatively connected to the pump. The support structure is configured to center the suppressor over the spray tube and to maintain the suppressor in vertical alignment with drainage clearance at both ends.

In one embodiment, the spray tube includes the sealed distal end to direct cleaning fluid through the alternating apertures.

In another embodiment, the reservoir includes a removable lid configured to provide sealed access to the reservoir's interior during cleaning operations.

In yet another embodiment, the electrical controls include at least one power switch accessible from the exterior surface of the base housing, and the support structure includes spacer elements configured to elevate the suppressor above the reservoir floor.

These and other objects of the present invention will be apparent from the review of the following specification and the accompanying drawings.

DETAILED DESCRIPTION OF EMBODIMENTS

Figure 1:
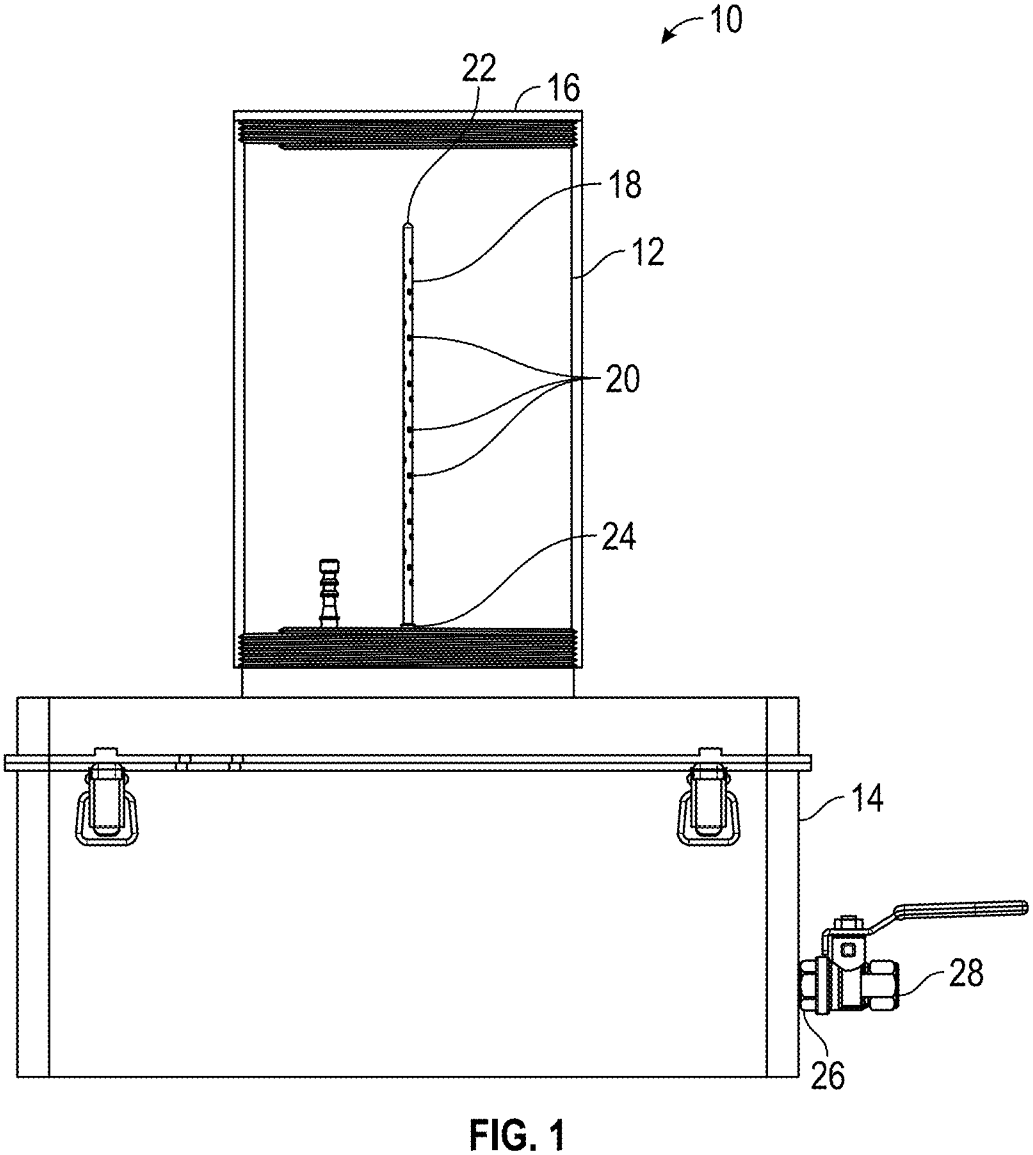
FIG. 1 is a front view of a cleaning apparatus for internally cleaning firearm suppressors, in accordance with one exemplary embodiment of the present subject matter.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this Specification are hereby incorporated by reference in their entireties. References cited in an Information Disclosure Statement should not be construed as an admission that the cited reference comes from an area that is analogous or directly applicable to the invention, but rather that the reference is being cited out of an abundance of caution.

Turning to the Figures, FIG. 1 is a front view of a cleaning apparatus 10 for internally cleaning firearm suppressors, in accordance with one exemplary embodiment of the present subject matter. Cleaning apparatus 10 includes a reservoir 12 supported on a base housing 14. Reservoir 12 is configured to contain cleaning fluid and is vertically oriented to receive a firearm suppressor in an upright position. A removable lid 16 is mounted on reservoir 12 to allow access to an interior of reservoir 12. A spray tube 18 is centrally positioned within reservoir 12 and is dimensioned to be insertable within a bore of a firearm suppressor. Spray tube 18 includes a plurality of apertures 20 distributed along a length of spray tube 18 and a sealed distal end 22 for directing pressurized cleaning fluid radially outward through apertures 20.

Spray tube 18 is mounted to the bottom surface of the reservoir 12 using compression fittings 24, which secure spray tube 18 and establish fluid communication with a pump 30 contained within base housing 14. In some aspects, spray tube 18 may have an outer diameter ranging from approximately 2 mm to 8 mm to accommodate various suppressor bore configurations. In one embodiment, spray tube 18 has an outer diameter of approximately 4 mm, which may be suitable for standard rifle suppressors having bore diameters typically ranging from 5.56 mm to 7.62 mm. In another embodiment, spray tube 18 may have an outer diameter of approximately 3 mm for smaller caliber suppressors, or approximately 6 mm for larger caliber applications. The length of spray tube 18 may range from approximately 50 mm to 400 mm to accommodate suppressors of varying lengths, with a typical length of approximately 150 mm being suitable for most common suppressor configurations.

In some cases, multiple spray tubes 18 of different diameters may be provided as interchangeable components to enable the cleaning apparatus 10 to service suppressors across a range of calibers and bore sizes. The spray tube 18 may include a tapered proximal end to facilitate insertion into suppressors with varying internal geometries. In certain embodiments, the outer surface of spray tube 18 may include alignment features or centering ribs to maintain proper positioning within the suppressor bore during cleaning operations.

A drain assembly 26 is coupled to reservoir 12 and extends outward from base housing 14. Drain assembly 26 includes a bottom drain port in fluid communication with reservoir 12 and an external quarter-turn valve 28 for controlled drainage of cleaning fluid. Inside the housing, a short length of flexible drain hose connects the bottom drain port of reservoir 12 to quarter-turn valve 28, the hose being secured to an integral hose barb on outlet of quarter-turn valve 28 so that an external waste line can be attached when quarter-turn valve 28 is opened.

Alternative embodiments of cleaning apparatus 10 may include variations in the material or configuration of reservoir 12. In one alternative embodiment, reservoir 12 may be formed from a transparent material to allow visual monitoring of cleaning operations. In another embodiment, base housing 14 may include additional electrical control interfaces or status indicators integrated into an exterior surface to facilitate operation and provide status feedback.

Figure 2A:
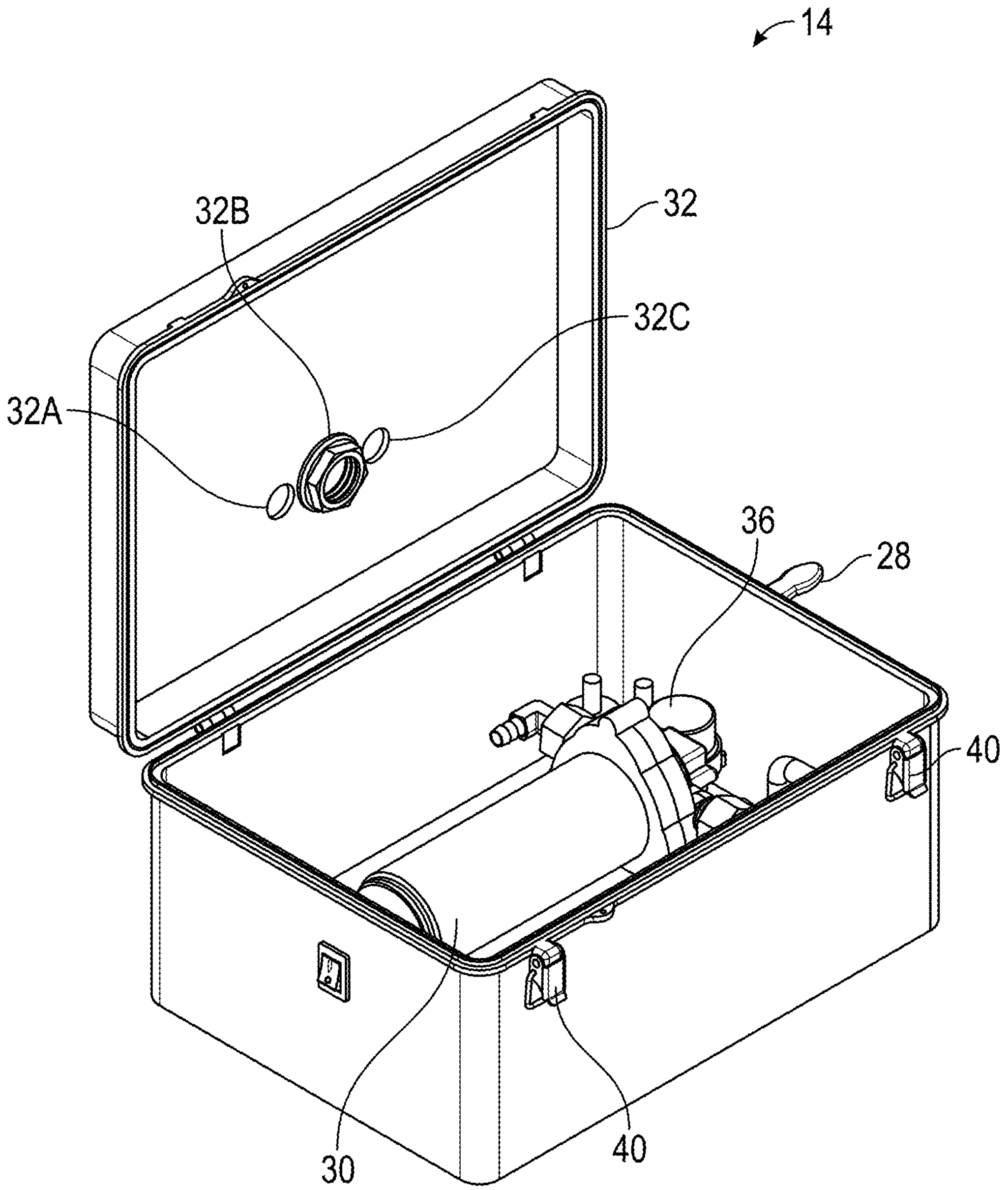
FIG. 2A is a perspective view of the base housing of the cleaning apparatus with the access panel in an open configuration, in accordance with one exemplary embodiment of the present subject matter.
Figure 2B:
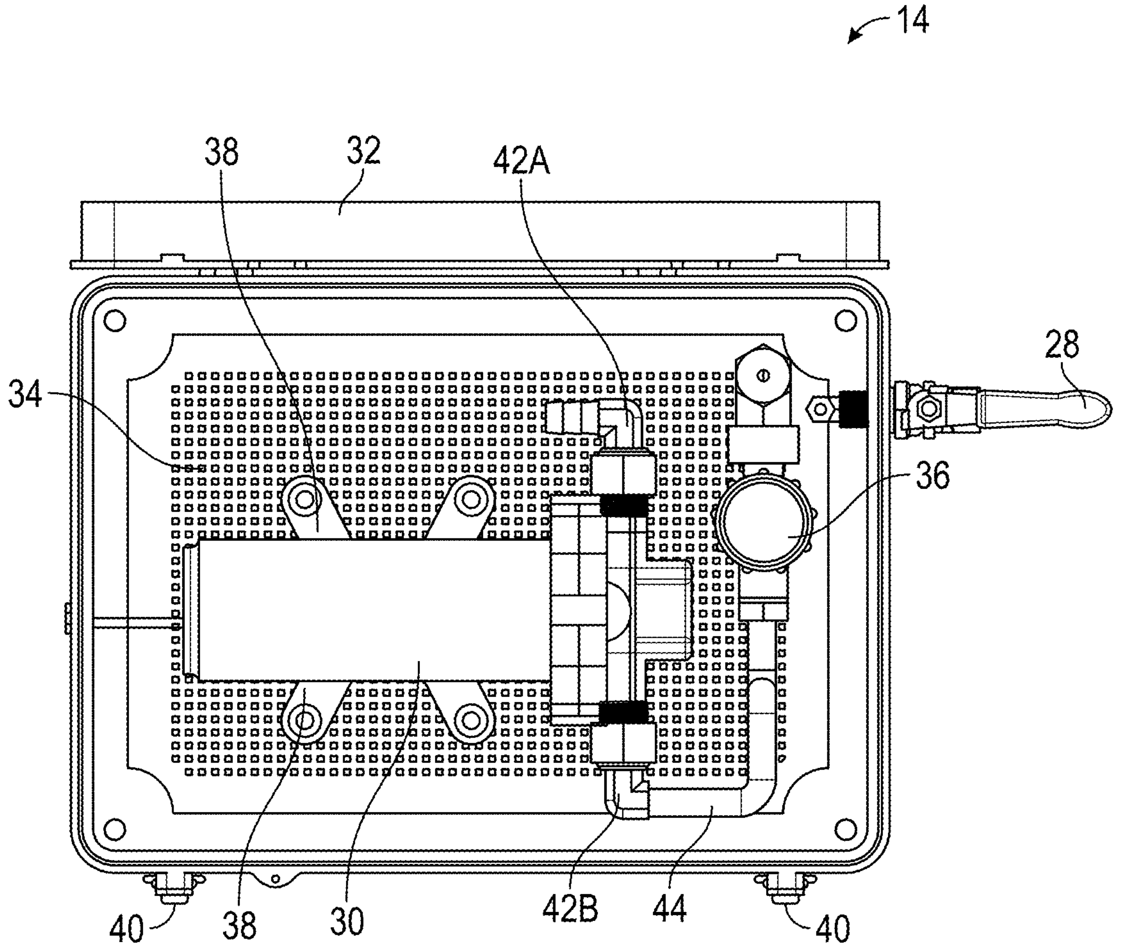
FIG. 2B is a top view of the base housing of the cleaning apparatus, showing the pump and internal components, in accordance with one exemplary embodiment of the present subject matter.

FIGS. 2A and 2B are perspective and top views, respectively, of base housing 14 of cleaning apparatus 10 for internally cleaning firearm suppressors, shown in an open configuration, in accordance with one exemplary embodiment of the present subject matter. Base housing 14 is configured to support reservoir 12 (not shown in these views) and to house pump 30, along with associated mounting and fluid-handling components. Base housing 14 is shown with an access panel 32 in an open position, providing user access to the internal layout for inspection, connection, or servicing.

Pump 30 is horizontally mounted along the floor of base housing 14 and is secured using mounting brackets 38, as shown in FIG. 2B. Mounting brackets 38 are arranged in a rectangular configuration and are configured to mechanically secure pump 30 while isolating vibration. In one embodiment, mounting brackets 38 may be fabricated from a thermoplastic elastomer to provide limited shock absorption. In another embodiment, mounting brackets 38 may incorporate quick-release clamps to facilitate tool-less removal of pump 30 for maintenance. Regardless of the variation, mounting brackets 38 are configured to retain pump 30 in a fixed position relative to base housing 14 during operation.

Base housing 14 includes a perforated mounting surface 34 positioned below pump 30. Mounting surface 34 is used to anchor internal components, route tubing, and accommodate variations in pump 30 footprint or orientation. The perforated grid pattern allows flexible repositioning of elements. In one embodiment, mounting surface 34 is formed from a chemical-resistant polymer composite. In another embodiment, mounting surface 34 is metallic and grounded to support electrostatic discharge mitigation where electronic components are present. A three-conductor power cord (not separately referenced) enters a rear wall of base housing 14 through a sealed strain-relief bulk head grommet. The cord terminates inside the housing in a wiring harness that feeds pump 30 and an illuminated rocker on/off switch mounted on access panel 32, allowing the operator to energize the system without opening access panel 32.

Pump 30 is connected to elbow fittings 42A, 42B at its fluid ports, with 900 hose barb fitting 42A at the discharge port and 90° hose barb fitting 42B at the suction port. Elbow fittings 42 are oriented to route fluid through 90° turns within the confined space of base housing 14. In one embodiment, elbow fittings 42 are formed from molded polypropylene. In another embodiment, elbow fittings 42 may be made from brass or stainless steel for compatibility with industrial solvents. Connected to elbow fittings 42 is a length of tubing 44 that establishes fluid communication between pump 30 and the other components of cleaning apparatus 10. Tubing 44 is routed along mounting surface 34 and may include hose clamps or fasteners to maintain its position. The flexible return hose (fluid line 84) is likewise clamped to a hose barb on the suction side of pump 30, providing a secure, leak-free connection under repeated thermal cycles.

A suction strainer 36 is mounted within base housing 14, adjacent to pump 30. Suction strainer 36 filters debris from the fluid return system. In one embodiment, suction strainer 36 is a mechanical filter with a mesh screen. Suction strainer 36 may be reconfigured to reside elsewhere within the suction-side system returning fluid to the pump 30.

Base housing 14 includes an externally mounted quarter-turn valve 28, shown prominently in both FIG. 2A and FIG. 2B. Quarter-turn valve 28 is connected to a drain port (not visible in these views) and forms part of drain assembly 26 used for controlled evacuation of cleaning fluid.

Access panel 32 is hinged to base housing 14 along a rear edge and is shown in the open configuration in FIG. 2A. Access panel 32 includes an inner recessed region for rigidity and is fastened to base housing 14 using front mechanical clasps 40. Mechanical clasps 40 are used to lock access panel 32 securely during operation or transport. In one embodiment, access panel 32 includes a perimeter gasket to provide a watertight seal.

Alternative embodiments of base housing 14 may include structural reinforcements, integrated cable organizers, or shock-mitigating inserts for pump 30. In another embodiment, mounting surface 34 may be modular and removable to allow access to underlying electronics or power modules. Elbow fittings or 90° barb hose fittings 42A, 42B and tubing 44 may be replaced with high-pressure braided lines for applications involving aggressive cleaning agents. Suction Strainer 36 may be reconfigured to reside elsewhere within the suction-side system returning fluid to the pump 30. Quarter-turn valve 28 may also be configured with tamper-proof features for use in safety-sensitive environments. Mechanical clasps 40 may be substituted with draw latches or cam locks to meet different vibration or environmental resistance requirements.

Figure 3A:
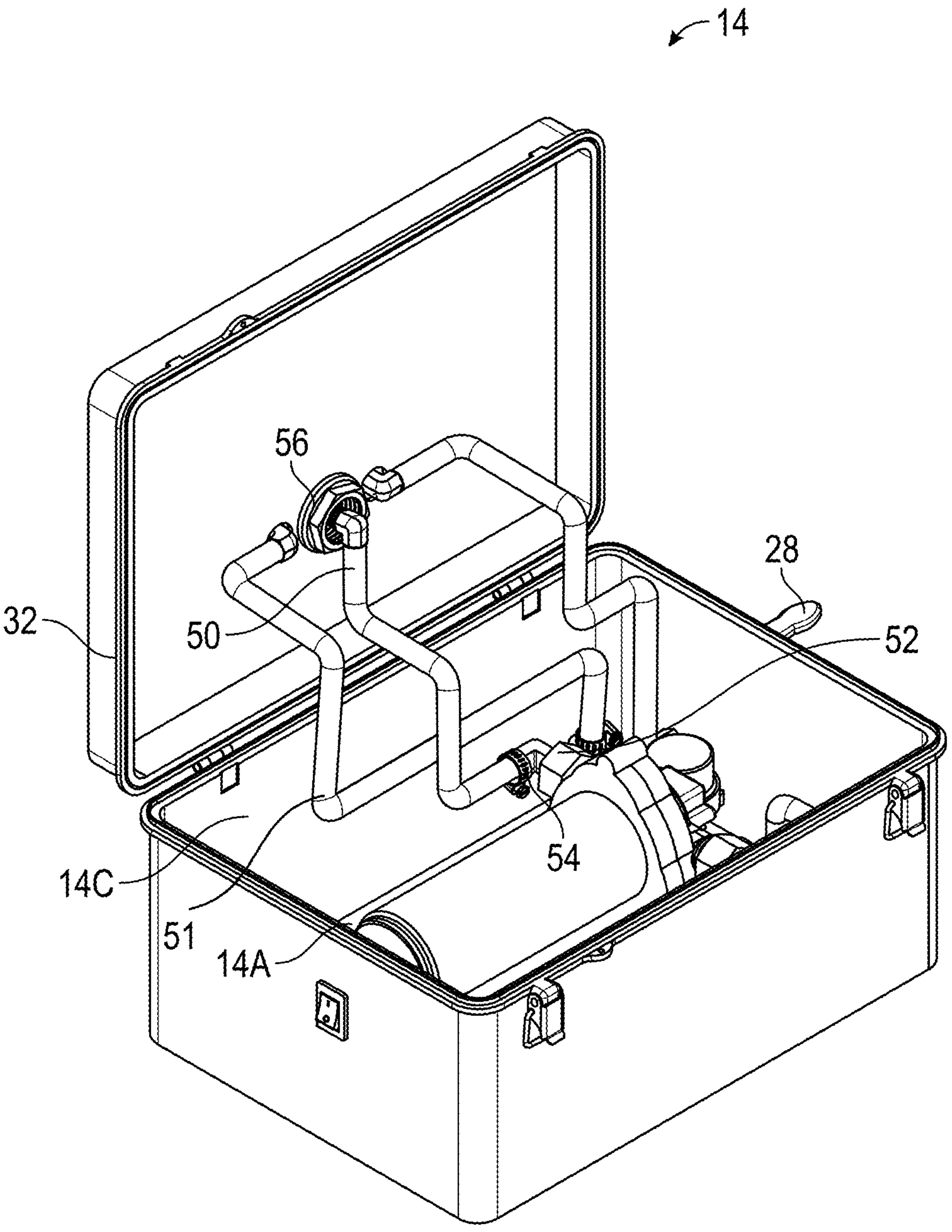
FIG. 3A is a perspective view of the internal fluid return system, including the flexible fluid discharge line and pump discharge fitting, in accordance with one exemplary embodiment of the present subject matter.
Figure 3B:
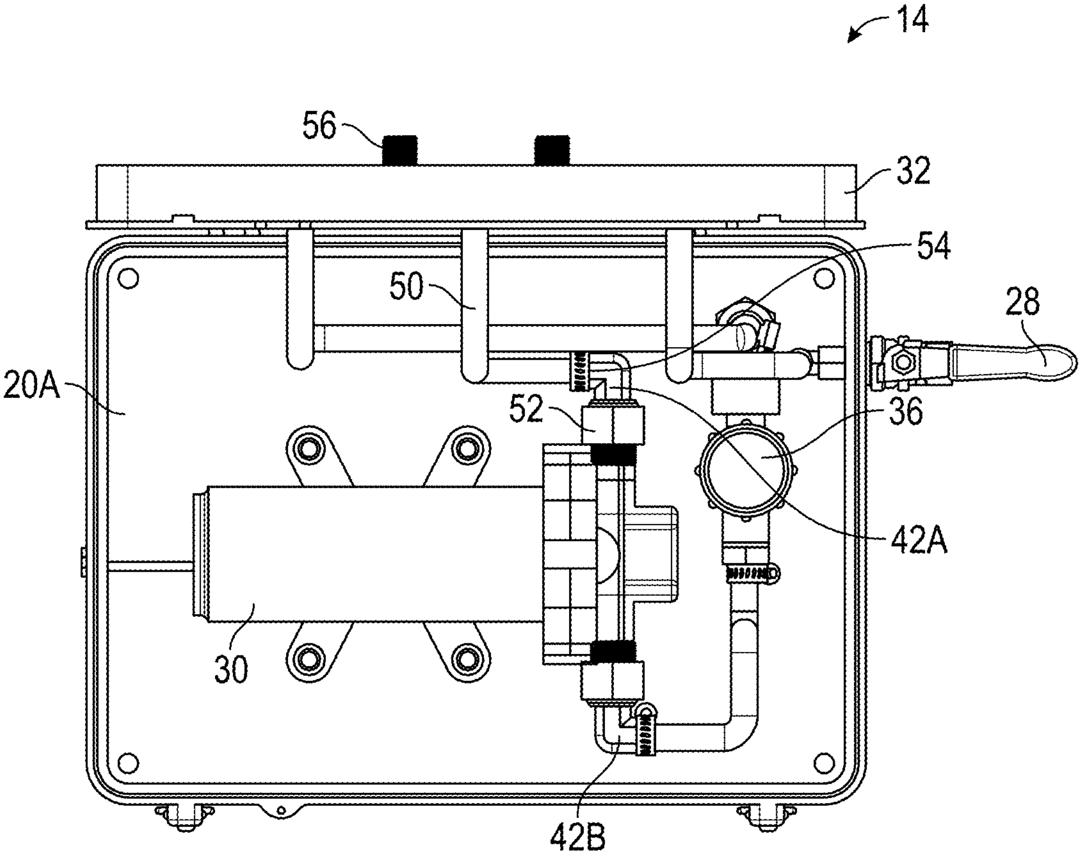
FIG. 3B is a top view of the fluid return system including the flexible fluid discharge line and pump discharge fitting, in accordance with one exemplary embodiment of the present subject matter.

FIGS. 3A and 3B illustrate an internal portion of base housing 14 of cleaning apparatus 10, in accordance with one exemplary embodiment of the present subject matter. FIG. 3A is a perspective view, and FIG. 3B is a top view, each showing flexible fluid discharge line 50, pump discharge fitting 52, and associated fluid return components. These views collectively highlight the layout and positioning of the internal fluid handling elements within base housing 14, and their functional relationship to previously described components in FIGS. 2A and 2B.

Flexible fluid discharge line 50 comprises an upwardly extending tube having a proximal end fluidly connected to a lower region of pump discharge fitting 52, and a distal end terminating at an elevated position within reservoir 12 (not shown in figures). The proximal end of flexible fluid discharge line 50 is coupled to pump discharge fitting 52 via a jam nut 56. Pump discharge fitting 52 is a rigid tubular conduit, preferably formed from a corrosion-resistant plastic such as polycarbonate or PVC, configured to deliver pressurized cleaning fluid from pump 30 into reservoir 12. The discharge line assembly, comprising flexible fluid discharge line 50, pump discharge fitting 52, and associated hose barb fittings, is located within the base housing 14 and is positioned between the pump 30 and the reservoir base plate 64.

As best viewed in FIGS. 3A and 3B, pump discharge fitting 52 extends horizontally along the inner surface of rear wall 14C, just above floor 14A, and curves gently to accommodate the connection with flexible fluid discharge line 50. Pump discharge fitting 52 is securely mounted to the inner surface of access panel 32, as evident from mounting clips or fasteners 54 visibly securing the structure in place. In one embodiment, pump discharge fitting 52 may be formed integrally with access panel 32 to reduce the number of detachable parts. In alternative embodiments, pump discharge fitting 52 may be removably mounted using releasable fasteners, allowing for easier maintenance or replacement.

A suction line 51 extends upward from the bottom wall of reservoir 12 and terminates approximately 50 mm (about two inches) above a base plate 64, so that it draws cleaning fluid from a mid-level height while allowing heavier particulates to remain settled on the reservoir floor. This configuration promotes cleaner fluid recirculation by drawing from a region less likely to accumulate heavy particulate matter during use. The suction system, comprising suction line 51, fluid return connector 80, and associated hose barb fittings, is situated within the base housing 14 between the pump 30 and the reservoir base plate 64.

Access panel 32 includes pre-cut access holes 32A, 32B, and 32C that allow fluid line fittings to pass through and establish connections with the reservoir assembly. Jam nut 56, as shown in FIG. 3A, is a threaded fastener that threads onto supply port 68 from underneath, once the reservoir 12 is positioned onto the access panel 32. Supply port 68 is a fabricated connector that protrudes beyond the surface of the access panel 32 through pre-cut access hole 32B. When the jam nut 56 is installed, it creates a mechanical connection, joining the reservoir 12 to the access panel 32. In other embodiments, quick-connect fittings may be employed to allow rapid assembly or disassembly without the use of tools. It is noted that the specific type of connector fitting may vary depending on manufacturing preferences or operational constraints, and such variations are considered to be within the spirit and scope of the invention.

Mounting clips 54 are affixed at regular intervals along the length of pump discharge fitting 52 and serve to retain the manifold securely against access panel 32 during operation. In some embodiments, mounting clips 54 may include vibration-dampening features such as rubber grommets to prevent noise or movement during pump actuation. Alternatively, pump discharge fitting 52 may be held in place via molded-in channels or integrated rail systems to facilitate streamlined internal geometry.

It is further noted that flexible fluid discharge line 50, as shown in the current embodiment, is formed from flexible tube. In alternative embodiments, semi-flexible tubing with internal support ribs may be employed, particularly if reservoir 12 includes a removable lid or interchangeable fluid reservoirs requiring flexibility in connection geometry. However, such alternatives do not depart from the intended functional scope of the invention as described herein.

The geometric orientation of suction line 51, as shown in FIGS. 3A and 3B facilitates efficient fluid return to pump 30 (previously described with respect to FIGS. 2A and 2B), completing the recirculating cleaning loop. This layout ensures that cleaning fluid collected within reservoir 12 is returned through suction line 51 into pump inlet for represurization and redistribution.

Figure 4A:
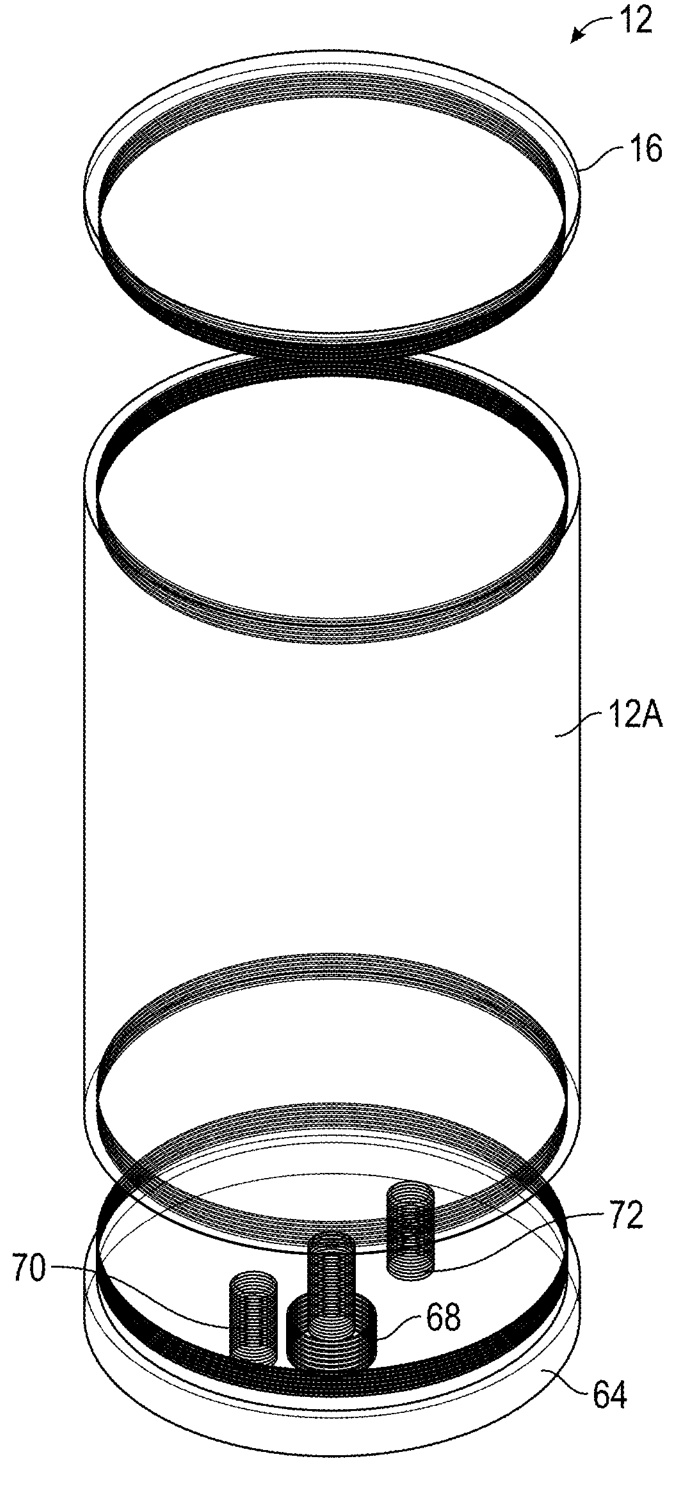
FIG. 4A is an exploded view of the reservoir assembly, including the cylindrical reservoir, base plate, and lid, in accordance with one exemplary embodiment of the present subject matter.
Figure 4B:
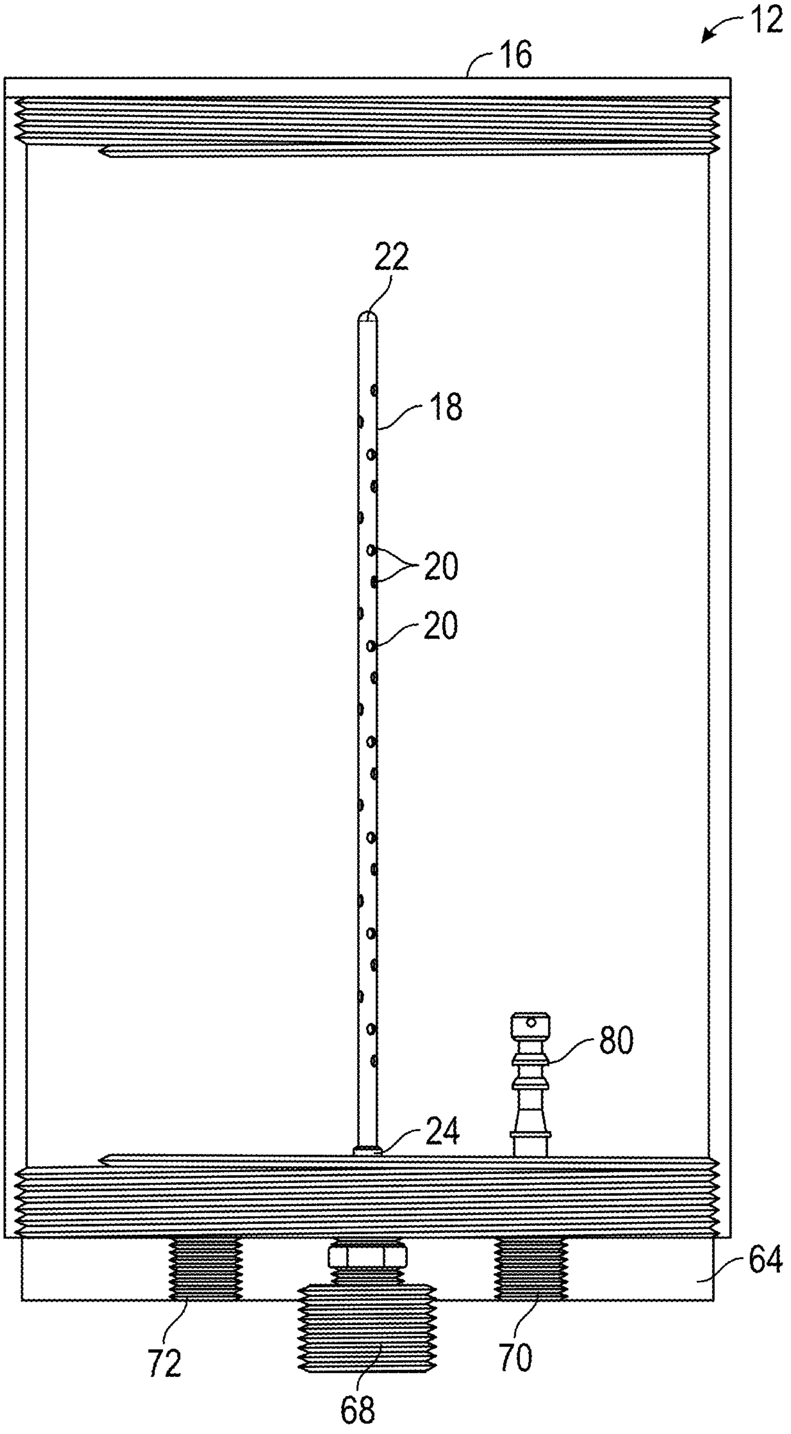
FIG. 4B is a sectional view of the reservoir assembly, showing the internal arrangement of the spray tube and fluid return components, in accordance with one exemplary embodiment of the present subject matter.
Figure 4C:
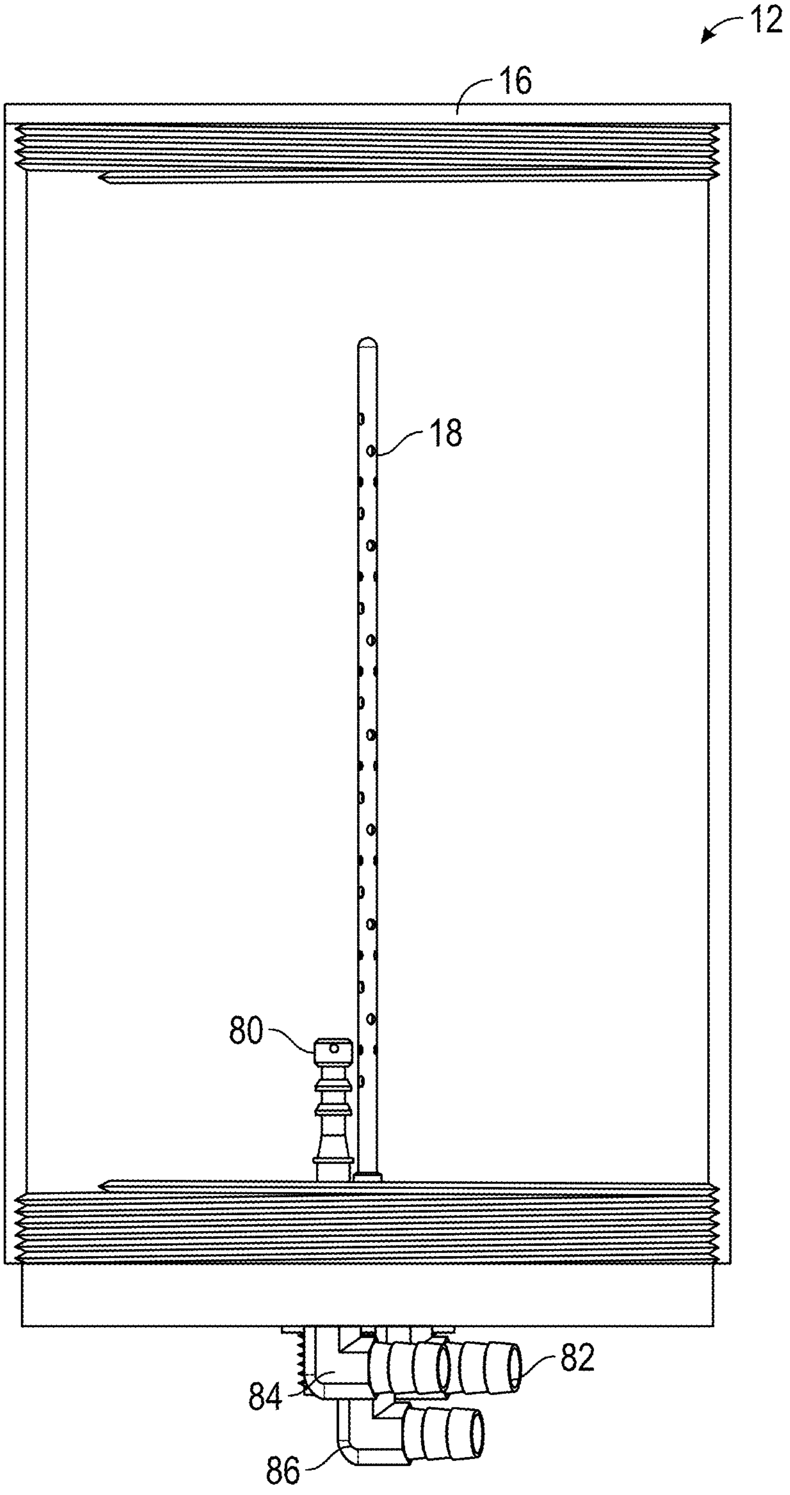
FIG. 4C is a sectional view of the reservoir assembly in an integrated and connected state, with fluid lines coupled, in accordance with one exemplary embodiment of the present subject matter.

FIGS. 4A, 4B, and 4C illustrate exploded, sectional, and assembled views, respectively, of reservoir 12 of cleaning apparatus 10 for internally cleaning firearm suppressors, in accordance with one exemplary embodiment of the present subject matter. FIG. 4A is an exploded view illustrating the constructional arrangement of reservoir 12 components. FIG. 4B is a sectional view showing internal fluid and spray elements before full assembly. FIG. 4C is a sectional view of reservoir 12 in an integrated and connected state with fluid lines coupled.

Reservoir 12 includes a cylindrical reservoir body 12A, base plate 64, and a removable lid 16. Reservoir 12 is vertically oriented and defines an internal volume for containing cleaning fluid during operation. Base plate 64 is secured to the lower end of reservoir 12 and includes a set of threaded ports 68, 70, and 72, which project downward and serve as fluid interface points for external connections. Removable lid 16 is configured to engage with the upper portion of reservoir 12 and may be removed to provide access to the interior. In one embodiment, reservoir 12 and removable lid 16 are constructed from transparent polycarbonate to allow visual inspection of the cleaning progress. In another embodiment, the components may be formed from high-density polyethylene (HDPE) or metallic material for increased chemical resistance. These alternative materials are provided by way of example and shall not be construed as limiting the scope of the present invention.

Threaded ports 68, 70, and 72 are configured for fluid connection and serve as mounting interfaces for the spray tube, fluid return, and drainage system, respectively. Specifically, threaded port 68 provides a direct coupling between the proximal end of spray tube 18 and pump 30 (as described in FIGS. 2A and 2B). While hose barb fitting 86 (as shown in FIG. 4C) connects the pump 30 to threaded port 68, the proximal end of spray tube 18 is directly coupled to pump 30 through this continuous fluid pathway, effectively creating a direct coupling between the spray tube and pump for delivering pressurized cleaning fluid. Threaded port 70 is connected to the suction inlet of pump 30 (described in FIGS. 2A and 2B) through fluid return connector 80, suction line 51 that is coupled to fluid return connector 80, and hose barb fitting 84(illustrated in FIGS. 3A and 3B). Threaded port 72 is coupled to quarter-turn valve 28 (described in FIG. 2A) via fluid line 82, and is configured to allow manual evacuation of spent cleaning fluid from reservoir 12. In one embodiment, each port includes internal threading with an O-ring seat to ensure sealed engagement. These variations in interface types are functional adaptations and do not limit the scope of the invention.

Spray tube 18 is vertically mounted inside reservoir 12 and is secured to base plate 64 via compression fittings 24. Spray tube 18 includes a series of radially spaced apertures 20 arranged along its central section. Apertures 20 are configured to discharge pressurized cleaning fluid radially outward into the interior bore of a suppressor placed over spray tube 18. The distal end of spray tube 18 is sealed, ensuring that fluid is expelled only through apertures 20. In one embodiment, apertures 20 are arranged in an alternating left-right pattern to balance spray forces. In another embodiment, apertures 20 may be configured in a helical pattern to induce rotational turbulence for improved surface coverage. It is expressly clarified that the orientation or distribution pattern of apertures 20 may vary without affecting the functional scope of the present invention. A non-metallic centering spacer is positioned on base plate 64 directly beneath spray tube 18 to keep a mounted suppressor co-axial with the tube and to maintain a drainage clearance of about 5 mm between the suppressor face and the compression fitting.

Fluid return connector 80, positioned adjacent to spray tube 18 on base plate 64, establishes a fluid return path from the reservoir to the suction inlet of pump 30 through fluid return connector 80 (see FIGS. 3A and 3B). In one implementation, fluid return connector 80 itself is elongated, about 50 mm in height, so that its open upper end lies approximately 50 mm (about two inches) above the reservoir floor, thereby drawing cleaning liquid from a mid-level zone rather than from the settled particle region at the bottom. In one embodiment, fluid return connector 80 incorporates a check valve to prevent reverse flow during shutdown; in another embodiment it may carry a flow restrictor or screen to limit debris intake. These configuration options for fluid return connector 80 are intended to provide functional flexibility and shall not be construed as limiting the invention.

As shown in FIG. 4C, fluid lines 82, 84, and 86 are connected to threaded ports 68, 70, and 72, respectively. Fluid line 86 supplies pressurized fluid from pump 30 to spray tube 18 via threaded port 68. The proximal end of spray tube 18 is secured to the alternate end of threaded port 68 located inside reservoir 12 using compression fittings 24, creating a continuous fluid pathway from pump 30 through hose barb fitting 86, through the base plate 64, through the compression fitting 24, and into spray tube 18. This arrangement effectively couples the proximal end of spray tube 18 to pump 30 through a direct and dedicated fluid connection, ensuring efficient transfer of pressurized cleaning fluid from the pump to the spray tube without intermediate components that could impede flow or pressure. Fluid line 84 returns used fluid from the reservoir to pump 30 via threaded port 70, routed through suction line 51(as seen in FIGS. 3A and 3B). Fluid line 82 forms a drainage path via threaded port 72 and is connected to quarter-turn valve 28 (described in FIG. 2A) for fluid evacuation. In one embodiment, fluid lines 82, 84, and 86 are made of flexible silicone tubing. In another embodiment, fluid lines 82, 84, and 86 may be semi-rigid polyethylene tubes with quick-disconnect couplings. Material or coupling variations in fluid lines 82, 84, and 86 are application-specific choices and do not limit the structural or operational scope of the invention.

The lower suction and discharge portion of the system resides within the base housing 14 between the pump 30 and the reservoir base plate 64. Both the suction and discharge systems include (starting at the pump 30) a 900 hose barb fitting attached to the pump 30. The discharge system uses 90° hose barb fitting 42A while the suction system uses 90° hose barb fitting 42B. Each system continues with a flexible hose connected to another 90° hose barb fitting that is threaded into the reservoir base plate 64. The discharge system comprises flexible fluid discharge line 50 that connects 900 hose barb fitting 42A at the pump 30 to pump discharge fitting 52, which in turn connects to supply port 68 in the reservoir base plate 64 via hose barb fitting 86. The discharge line fitting is threaded into the reservoir base plate 64 in a central location through pre-cut access hole 32B in the access panel 32, into a threaded port inside the raised/threaded portion of the base plate numbered 68 (FIG. 4B). The suction system comprises suction line 51 that connects 900 hose barb fitting 42B at the pump 30 to fluid return connector 80 via return port 70 in the reservoir base plate 64 through hose barb fitting 84. The suction line fitting is threaded into the reservoir base plate 64 through a pre-cut access hole 32A in the access panel 32. The drainage system connects to drain port 72 via hose barb fitting 82. The drain line fitting is similarly connected through pre-cut access hole 32C in the access panel 32. Both fluid lines 50 and 51 utilize 90° hose barb fittings at both ends. The pump-side fittings include 90° hose barb fitting 42A for discharge and 90° hose barb fitting 42B for suction, both attached directly to the pump 30 within the base housing 14. The reservoir-side fittings include hose barb fitting 86 for discharge to port 68, hose barb fitting 84 for suction return to port 70, and hose barb fitting 82 for drainage to port 72, all threaded into the respective ports in the reservoir base plate 64. This configuration allows the pump 30 and associated plumbing to remain completely within the base housing 14 while establishing secure fluid connections to the reservoir 12 above. Reservoir 12 is removably mountable on base housing 14 (described in FIG. 2A) to facilitate cleaning, replacement, or servicing. In one embodiment, base plate 64 includes integrated guide slots to align with retention features in base housing 14 for secure placement. In another embodiment, base plate 64 may incorporate a molded-in drainage channel surrounding threaded port 72 to manage fluid spillage during disconnection. These optional design features enhance usability but shall not be construed as narrowing the scope of the present invention.

Figure 5:
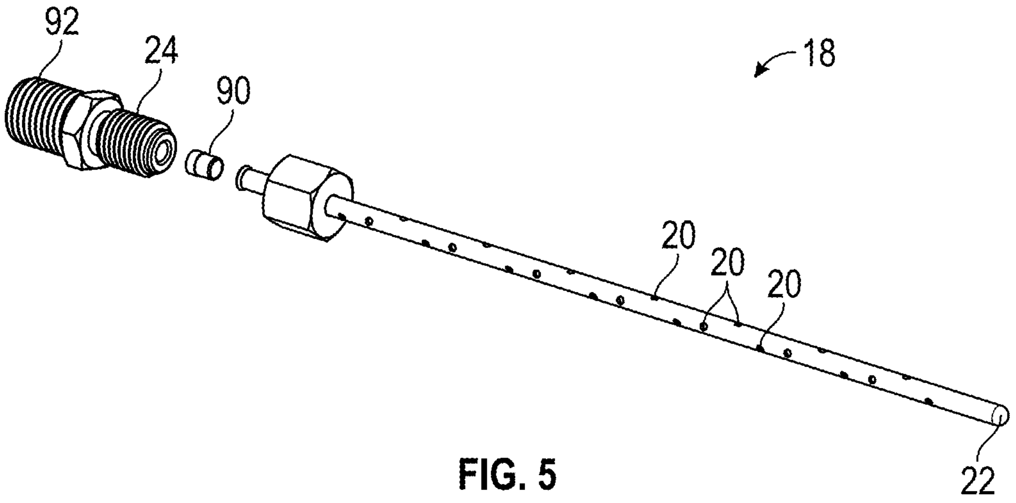
FIG. 5 is an exploded perspective view of the spray tube and its mounting and sealing components, in accordance with one exemplary embodiment of the present subject matter.

FIG. 5 is an exploded perspective view of spray tube 18 and its associated mounting and sealing components, in accordance with one exemplary embodiment of the present subject matter. Spray tube 18 is an elongated cylindrical tube having a closed distal end and a plurality of radially spaced apertures 20 arranged along a central portion of its length. Apertures 20 are configured to discharge pressurized cleaning fluid radially outward into the interior bore of the firearm suppressor mounted over spray tube 18 (as illustrated in FIGS. 4B and 4C).

Spray tube 18 is coupled to compression fittings 24, which enables secure attachment to threaded port 68 on base plate 64 (described in FIG. 4B). The compression fittings 24 includes an outer threaded housing and an internal sealing ferrule that compresses around spray tube 18 when tightened. A sealing washer or ferrule ring 90 is provided between spray tube 18 and compression fittings 24 to ensure a fluid-tight seal. A threaded male connector 92 interfaces with the internal side of base plate 64 and completes the fluid path from pump 30 to spray tube 18 (as described in FIGS. 2A and 2B).

In one embodiment, spray tube 18 may have an outer diameter of approximately ranging between 3 mm to 6 mm to accommodate standard suppressor bore sizes. In another embodiment, the number and spacing of apertures 20 may be varied based on desired cleaning intensity or fluid pressure. Compression fittings 24 may be formed from brass, stainless steel, or reinforced polymer. These variations in component dimensions and materials are considered practical adaptations and do not limit the scope of the present invention.

Figure 6:
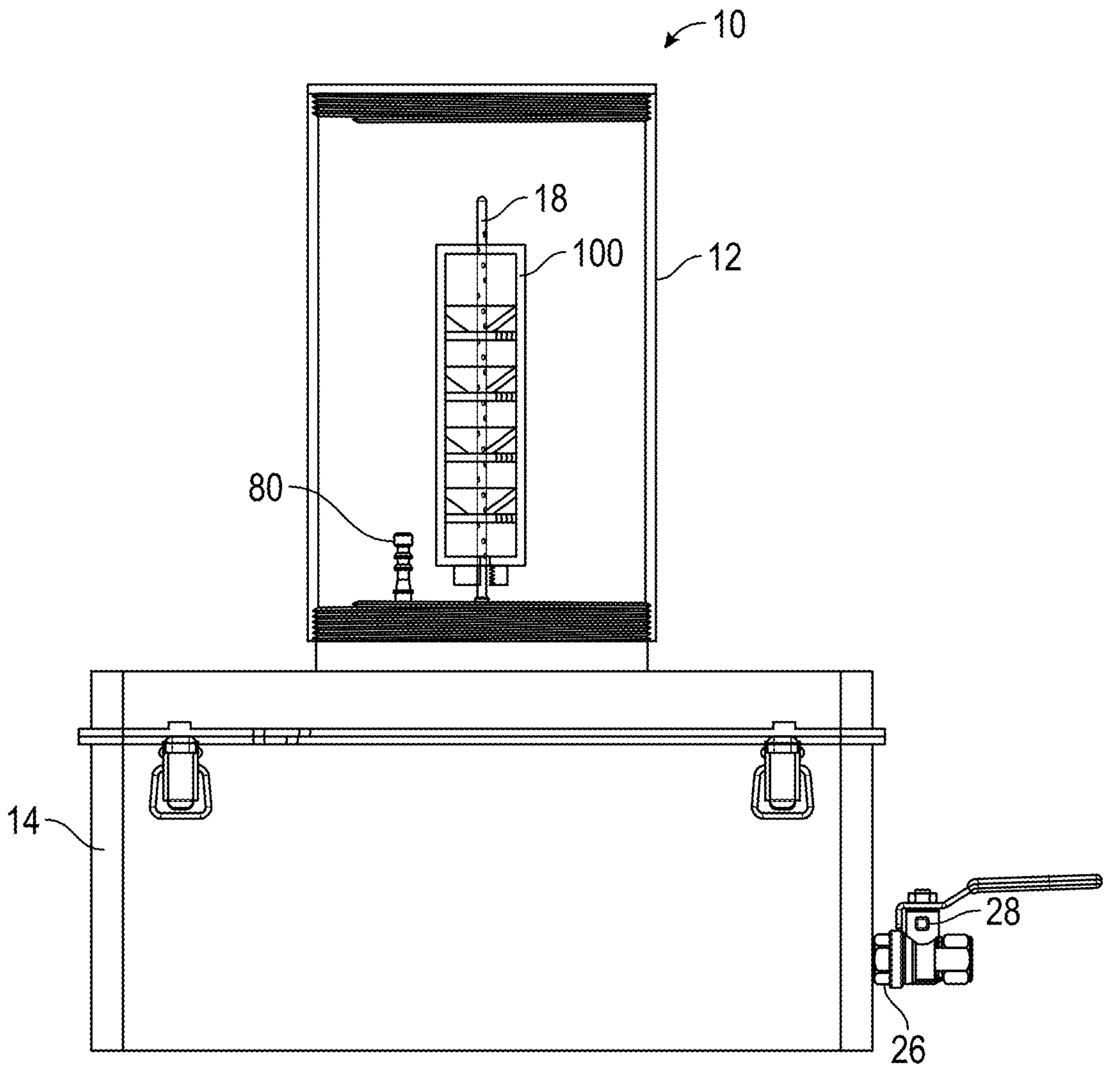
FIG. 6 is a front view of the cleaning apparatus in operational use, with a suppressor mounted on the spray tube and fluid recirculating through the system, in accordance with one exemplary embodiment of the present subject matter.

FIG. 6 is a front view of cleaning apparatus 10 during operational use, illustrating the fluid recirculation process and interaction between internal components, in accordance with one exemplary embodiment of the present subject matter. Apparatus 10 includes base housing 14, reservoir assembly 12, and spray tube 18 mounted therein. The sectional view of reservoir assembly 12 in FIG. 6 depicts a firearm suppressor 100 positioned in a vertical orientation over spray tube 18, supported concentrically within cylindrical reservoir body 12A.

During operation, pump 30 (described in FIGS. 2A and 2B) draws cleaning fluid from the bottom of reservoir assembly 12 through fluid return connector 80 (as shown in FIGS. 3A and 3B) via fluid line 84 and threaded port 70 (described in FIG. 4B). The suctioned fluid enters the pump and is pressurized before being discharged through fluid line or hose barb fitting 86 (shown in FIG. 4C) into threaded port 68, which is fluidly connected to spray tube 18 via compression fittings 24 (described in FIG. 5).

Pressurized fluid travels upward through spray tube 18 and exits through radially spaced apertures 20, which are arranged along the central length of spray tube 18. As firearm suppressor 100 is concentrically mounted over spray tube 18, the discharged fluid directly impacts the internal bore surface of firearm suppressor 100, thoroughly cleaning residue or particulates deposited along the suppressor walls. The sealed distal end of spray tube 18 ensures unidirectional radial discharge through the apertures 20, allowing a controlled, even fluid dispersion across the full interior surface of firearm suppressor 100.

It is to be noted that fluid originating from multiple points along the spray tube 18 exits both ends of the suppressor 100 to return to the reservoir 12. Fluid evacuation from the suppressor 100 occurs from both the top and bottom ends, thereby circumventing flow restrictions that may result from the internal design of the suppressor 100. This configuration differs from conventional designs that mechanically connect a suppressor to a fluid supply fitting, where the suppressor internals may restrict flow by creating pressure buildup in individual chambers and confining fluid circulation to the center bore after the internal chambers are filled.

The spent cleaning fluid then flows downward by gravity along the inner surface of firearm suppressor 100, accumulating in the lower region of reservoir body. From there, it is drawn back through fluid return connector 80, thus completing the recirculation cycle. More specifically, the reservoir working fluid level is above the height of the spray tube. Therefore, fluid is evacuating the suppressor from both the top and bottom ends and returning as part of the reservoir volume to continuously replace fluid being drawn to the pump. As seen in FIG. 6, the alignment of firearm suppressor 100 with spray tube 18 ensures minimal fluid loss and maximized cleaning coverage. In one embodiment, firearm suppressor 100 may be centered and elevated above the reservoir floor by spacer elements (not shown in this view but illustrated in FIG. 4C) to permit unrestricted fluid drainage from both ends.

In an alternative embodiment, cleaning apparatus 10 may include optical or electronic sensors (not shown) to detect suppressor alignment or fluid pressure anomalies, allowing automated start-stop cycling or diagnostic reporting. These alternative features, while optional, are consistent with the purpose and scope of the invention. It is expressly clarified that such enhancements are illustrative and shall not be interpreted to limit the scope of the invention as defined by the appended claims.

FIG. 6 thereby illustrates the complete closed-loop operational configuration of cleaning apparatus 10, wherein pressurized cleaning fluid is delivered to spray tube 18, discharged radially into the firearm suppressor 100, and returned for continuous reuse, enabling efficient, enclosed, and contact-free internal cleaning of firearm suppressors.

Sealed firearm suppressors present unique cleaning challenges due to their lack of user-accessible disassembly features and internal design. These suppressors may be characterized by unitary or welded construction, preventing end-user disassembly. Some sealed suppressors may have monolithic outer tubes with permanently fixed internal baffles, while others may feature end caps welded or permanently bonded to the main body. The absence of user-accessible disassembly features may include lack of threaded joints between sections, non-removable end caps, or inseparable blast baffles. While some sealed suppressors may incorporate specialized internal geometries or coatings to reduce fouling accumulation, they still require periodic cleaning for optimal performance. The cleaning apparatus 10 addresses these challenges by enabling thorough internal cleaning without disassembly or specialized tools typically needed to access interior surfaces of sealed suppressors. The spray tube 18 and fluid recirculation system allow effective cleaning of the entire internal surface, particularly benefiting suppressors designed to be permanently sealed or those requiring specialized expertise for disassembly. The vertical orientation of the suppressor 100 over the spray tube 18, combined with the radial discharge of cleaning fluid through apertures 20, enables effective cleaning of the entire internal surface of sealed suppressors.

The embodiments provide for several advantages over the prior art. For example, the use of a vertically mounted spray tube 18 with radially oriented apertures 20 enables uniform and comprehensive cleaning of the interior surfaces of firearm suppressor 100 without requiring manual repositioning. Unlike traditional cleaning methods that rely on external brushes or immersion-based approaches, the present invention facilitates internal pressurized cleaning through a sealed and controlled environment, thereby reducing operator exposure to hazardous residue.

Further, the integration of a recirculating fluid return system, comprising fluid return connector 80, and pump 30, enables continuous reuse of cleaning fluid, which significantly improves fluid efficiency and reduces operational cost. The configuration of threaded ports 68, 70, and 72 (as described in FIG. 4B) allows modular assembly, easy maintenance, and secure sealing, enhancing the robustness and serviceability of the system.

Additionally, the adaptability of reservoir assembly 12 to accept various suppressor sizes and geometries without requiring mechanical modification makes the apparatus versatile for different firearm platforms. The sealed spray mechanism avoids splashing and uncontrolled discharge, contributing to environmental cleanliness and operator safety.

The structural separation of pump 30 from reservoir assembly 12 (as shown in FIGS. 2A and 4C) allows for better thermal and mechanical isolation, ensuring stable fluid pressure and extended component life. These and other advantages will be apparent from the foregoing description and will be better understood from the scope of protection defined by the appended claims.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

REFERENCE NUMERALS

10 cleaning apparatus
12 reservoir
12A cylindrical body
14 base housing
14A housing floor
14C rear wall
16 removable lid
18 spray tube
20 apertures
22 sealed end
24 compression fittings
26 drain assembly
28 quarter-turn valve
30 pump
32 access panel
32A suction line access hole
32B discharge line access hole
32C drain line access hole
34 mounting surface
36 suction strainer
38 mounting brackets
40 mechanical clasp
42A 900 hose barb fitting—pump discharge port
42B 900 hose barb fitting—pump suction port
44 fluid tubing
50 flexible fluid discharge line
51 suction line
52 pump discharge fitting
54 mounting clips
56 jam nut
64 base plate
68 supply port
70 return port
72 drain port
80 fluid return connector
82 drain line
84 return fluid line
86 pressure supply line
90 sealing washer
92 threaded connector
100 suppressor

What is claimed is:

1. A cleaning apparatus for internally cleaning firearm suppressors, comprising:

a reservoir configured to contain a cleaning fluid;

a pump in fluid communication with the reservoir and configured to pressurize the cleaning fluid;

a spray tube having a proximal end and a distal end, the proximal end being coupled to the pump, the spray tube including a plurality of apertures distributed along a length thereof and configured to discharge the pressurized cleaning fluid radially outward, wherein the spray tube is dimensioned to be insertable within a bore of a firearm suppressor; and a fluid return system configured to collect the cleaning fluid discharged from the firearm suppressor and return the collected cleaning fluid to the reservoir for recirculation through the pump.

2. The cleaning apparatus of claim 1, wherein the spray tube has an outer diameter between about 3 mm and about 6 mm.

3. The cleaning apparatus of claim 1, wherein the apertures are arranged in an alternating pattern along opposing sides of the spray tube.

4. The cleaning apparatus of claim 1, wherein the distal end of the spray tube is sealed to direct the pressurized cleaning fluid through the apertures.

5. The cleaning apparatus of claim 1, wherein the fluid return system includes a suction strainer positioned in the reservoir.

6. The cleaning apparatus of claim 5, wherein the suction strainer is configured to filter debris from the cleaning fluid returning to the pump.

7. The cleaning apparatus of claim 1, further comprising a base housing supporting the reservoir, wherein the pump is contained within the base housing.

8. The cleaning apparatus of claim 7, further comprising a drain assembly connected to the reservoir and accessible from an exterior of the base housing.

9. The cleaning apparatus of claim 1, wherein the reservoir includes a removable lid configured to provide access to an interior of the reservoir.

10. A cleaning apparatus for internally cleaning firearm suppressors, comprising:

a reservoir having a bottom wall with at least two fluid connection ports;

a pump positioned below the reservoir;

a spray tube extending upward from the bottom wall and having a sealed distal end and a plurality of apertures, the spray tube being dimensioned to fit within standard suppressor bore diameters;

a pressurized fluid supply line connecting the pump to the spray tube through a first fluid connection port;

a fluid return system connecting the pump to a second fluid connection port and including a suction strainer;

electrical controls operatively connected to the pump; and a support structure configured to position a firearm suppressor over the spray tube such that the suppressor is maintained in a vertical orientation with clearance from the bottom wall.

11. The cleaning apparatus of claim 10, wherein the spray tube has an outer diameter of approximately 4 mm.

12. The cleaning apparatus of claim 10, wherein the apertures are positioned along a middle portion of the length of the spray tube, with the end portions being free of apertures.

13. The cleaning apparatus of claim 10, wherein the suction strainer is configured to prevent intake of settled particulates.

14. The cleaning apparatus of claim 10, further comprising a drain assembly including a third fluid connection port in the bottom wall and an externally accessible drain assembly.

15. The cleaning apparatus of claim 10, wherein the reservoir is transparent to allow visual monitoring of cleaning operations.

16. The cleaning apparatus of claim 10, wherein the support structure includes spacer elements configured to elevate the suppressor above the bottom wall while allowing cleaning fluid to drain from both ends of the suppressor.

17. A cleaning apparatus for internally cleaning firearm suppressors, comprising:

a reservoir having a cylindrical configuration;

a base housing supporting the reservoir and containing a pump;

a spray tube having an outer diameter sized to fit within standard firearm suppressor bores and including alternating apertures spaced along a central section of the spray tube, wherein the alternating apertures are arranged such that adjacent apertures are positioned on opposite sides of the spray tube;

compression fittings securing the spray tube to the base housing and connecting the spray tube to a discharge output of the pump;

a fluid return system including a suction strainer and connected to an intake of the pump, wherein the suction strainer is configured to avoid intake of settled particulates;

a drain assembly including a bottom drain port in fluid communication with the reservoir and an external quarter-turn valve;

electrical controls integrated into the base housing and operatively connected to the pump; and a support structure configured to center a firearm suppressor over the spray tube and maintain the suppressor in vertical alignment with drainage clearance from both ends of the suppressor.

18. The cleaning apparatus of claim 17, wherein the spray tube includes a sealed distal end configured to direct the pressurized cleaning fluid through the alternating apertures.

19. The cleaning apparatus of claim 17, wherein the reservoir includes a removable lid configured to provide sealed access to an interior of the reservoir during cleaning operations, and wherein the electrical controls include at least one power switch accessible from an exterior surface of the base housing, and wherein the support structure includes spacer elements configured to elevate the firearm suppressor above the floor of the reservoir.

* * * * *